United States Patent [11] 3,624,040

[72] Inventors Herman Rath
Neu-Isenburg;
Hans-Jochen Rothe, Offenbach/Main; Otto Friedrich De Riz, Doernigheim/Main, all of Germany
[21] Appl. No. 23,477
[22] Filed Mar. 27, 1970
[45] Patented Nov. 30, 1971
[73] Assignee Vickers Zimmer Aktiengesellschaft Planung und Bau von Industrieanlagen
Continuation-in-part of application Ser. No. 636,276, May 5, 1971, now abandoned. This application Mar. 27, 1970, Ser. No. 23,477

[54] PROCESS FOR THE PRODUCTION OF POLYETHYLENE TEREPHTHALATE
11 Claims, No Drawings

[52] U.S. Cl. ........................................................ 260/75 R,
260/242, 260/270 R
[51] Int. Cl. ..................................................... C08q 17/015,
C07f 9/90
[50] Field of Search ............................................. 260/75, 75 C

[56] References Cited
UNITED STATES PATENTS
3,055,870 9/1962 McIntyre et al. ............. 260/75

*Primary Examiner*—William H. Short
*Assistant Examiner*—Louise P. Quast
*Attorney*—Molinare, Allegretti, Newitt and Witcoff

ABSTRACT: Process for polycondensing di(alkylene glycol) terephthalate by use of metal compounds as catalysts in which the metal compound is an antimony complex of the formula $$[SbX_n] \cdot \frac{n-3}{m} Z,$$

where X signifies a halogen or thiocyanate, $n$ is a whole number from four to six, preferably, five, and Z is selected from the group consisting of di(pyridyl) ethylene and di(morpholino) ethane bases of basicity (+valence) $m=2$, and mixtures of said bases.

PROCESS FOR THE PRODUCTION OF POLYETHYLENE TEREPHTHALATE

This case is a continuation-in-part of Ser. No. 636,276 filed May 5, 1967 now abandoned.

It is known that in the production of polyethylene terephthalate by (1) direct esterification of an alkylene glycol with terephthalic acid, and (2) transesterification of dialkyl terephthalate with alkylene glycol, to produce di(alkylene glycol) terephthalate, followed by subsequent polycondensation thereof, both the esterification (direct or transesterification) and the polycondensation can be promoted and accelerated by various catalysts. A typical example is the catalytic transesterification of dimethyl terephthalate (DMT) with ethylene glycol to produce di(ethylene glycol) terephthalate (DGT) and subsequent polycondensation to form polyethylene terephthalate.

However, the presence of special polycondensation catalysts, such as $Sb_2O_3$, which are conveniently added during the esterification reaction, has a bad effect on the whole process since the esterification of DMT into DGT is considerably retarded, and, for example, a noticeable increase in methanol impurities is caused. Similar problems are observed when the esterification catalysts are present during the polycondensation reaction.

The length of the polycondensation time is of decisive importance for the color of the polycondensate. Furthermore, extended polycondensation times lead to polyesters with poor textile properties, for example, lower strength.

It is highly desirable, therefore, to restrict to a minimum the time required for the esterification and polycondensation. This invention relates to polycondensation catalysts which make it possible to limit the length of the polycondensation to from 120 to 180 minutes, as compared to the usual polycondensation times, and the resulting polyesters have intrinsic viscosities $\eta$ ranging from 0.7 to 0.95. In our preferred examples it is possible to produce polyesters having intrinsic viscosities of 0.9 to 0.95, a melting point range of 262° to 264° C., high-strength, and very good hydrolytic stability, in that period of time.

The invention is a process for the production of polyalkylene terephthalates, specifically polyethylene terephthalate, by direct esterification of ethylene glycol with terephthalic acid or transesterification of an alkylene glycol with a dialkyl terephthalate, and a subsequent polycondensation reaction in the presence of metal compounds as catalysts, in which the metal compound is an antimony complex compound of the formula:

$$[SbX_n] \cdot \frac{n-3}{m} Z,$$

where X signifies a halogen or thiocyanate, n is a whole number from four to six, preferably five, and Z is selected from di(pyridyl) ethylene and di(morpholino)ethane bases of basicity (+valence) m=2, and mixtures of said bases.

Since the anion complex [SbX₅] is easy to prepare, the complex compounds derived therefrom are preferred. The base moiety accumulates in protonized (+) form on the anion complex. The preparation of typical polycondensation catalysts is illustrated in the following examples.

A. 1,2-di(2-pyridyl)ethylene-antimony pentabromide

To 200 ml. of a 0.05-molar solution of antimony (+3)-acetate in anhydrous methanol or ethanol there are slowly added 250 ml. of a 1-normal aqueous solution of potassium bromide. Thereupon 500 ml. of a 0.1-molar solution of trans-1,2-di(2-pyridyl)ethylene as the base moiety in hydrochloric acid having a ₚH-value of between 0.5 to 1, are slowly added at about 40° C. A precipitate forms and is let stand. The precipitate is filtered after about 5 hours standing and washed with about 150 ml. of a 0.1-normal solution of potassium bromide in anhydrous methanol. Alternatively, the precipitate may be washed with the potassium bromide in anhydrous ethanol.

B. 1,2-di(4-pyridyl) ethylene-antimony pentabromide

This compound is prepared in the same manner as in example A except that trans-1,2-di(4-pyridyl)ethylene is used instead of trans 1,2-di(2-pyridyl)ethylene.

C. 1,2-(dimorpholino)ethane-antimony pentabromide

This compound is prepared in the same manner as in example A using 1,2-(dimorpholino)ethane instead of trans-1,2-di(2-pyridyl)ethylene.

D-I. Antimony pentaiodides (D-F) and antimony pentathiocyanates (G-I) of each of the three bases under A to C In the same manner and conditions as in example A above, the following six compounds are prepared using the appropriate base, either 1,2-di(2-pyridyl)ethylene, 1,2-di(4-pyridyl-ethylene, or 1,2-(dimorpholino)-ethane with the anion moiety from potassium iodide (D-F), or potassium thiocyanate (G-I):

D. 1,2-di(2-pyridyl)ethylene-antimony pentaiodide;
E. 1,2-di(4-pyridyl)ethylene-antimony pentaiodide;
F. 1,2-(dimorpholino) ethane-antimony pentaiodide;
G. 1,2-di(2-pyridyl)ethylene-antimony pentathiocyanate;
H. 1,2-di(4-pyridyl)ethylene-antimony pentathiocyanate;
I. 1,2-(dimorpholino)ethane-antimony pentathiocyanate;

By the process of the invention it is possible to produce linear polyesters which are suited for the continuous or discontinuous production of cuttings and textile fibers. The polyesters obtained according to the invention have a good color and high-viscosity and strength. They are especially suited for the production of technical silk, for example tire cord.

The details of the process are explained in the following examples; the improved results achieved are evident from the technical data presented in table 1 and the comparative examples 10 to 18.

EXAMPLE 1

One hundred g. of dimethyl terephthalate were transesterified in a laboratory autoclave of V2A steel with ethylene glycol in the presence of zinc acetate (0.056 percent by weight) under agitation. The transesterification time was fixed at about 2.5 hours, during which time the temperature was continuously raised from 160° C. to 240° C. Thereupon, in the same autoclave, the polycondensation was carried out by the addition of 0.1 percent by weight of 1,2-di(2-pyridyl)ethylene-antimony pentabromide,

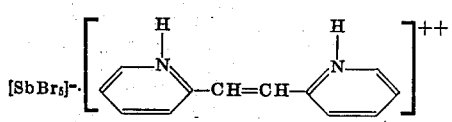

during the course of which the condensation temperature was raised continuously from 275° C. to 285° C. The pressure in the autoclave was reduced continuously from 200 torr to about 0.4 torr (1 torr = 1333.2 bars, or 1 mm. Hg at 0° C. and standard gravity, which is approximately 1/50 of 1 p.s.i.; thus, 200 torr is about 4 p.s.i.). The polycondensation time amounted to about 2 hours. The results are presented in table 1.

EXAMPLE 2

The transesterification and polycondensation were carried out under the same conditions as in example 1. 0.1 percent 1,2-di[4-pyridyl]ethylene-antimony pentabromide was used as the polycondensation catalyst.

EXAMPLE 3

Transesterification and polycondensation are repeated as described in example 1 and 0.05 percent of the compound indicated under example 2 was used as the polycondensation catalyst.

EXAMPLE 4

Example 1 is repeated using 0.01 percent of the catalyst used in example 2.

EXAMPLE 5

In this example, the same transesterification conditions as under example 1 were used. The same amount of polycondensation catalyst as in example 4 was used, and the polycondensation time amounted to 3 hours.

EXAMPLE 6

Example 5 is repeated with a polycondensation time of 4 hours.

EXAMPLE 7

The polycondensation is carried out with 0.01 percent 1,2-(Dimorpholino)ethane-antimony pentaiodide as catalyst. The polycondensation time amounts to 2 hours. The catalyst formula is:

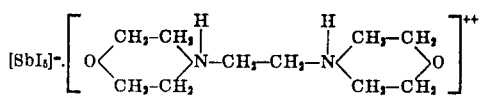

EXAMPLE 8

The polycondensation is carried out with the addition of 0.05 percent 1,2-di(2-pyridyl) ethylene-antimony pentaiodide as catalyst.

EXAMPLE 9

The polycondensation is carried out with the addition of 0.05 percent 1,2-di(2-pyridyl) ethylene-antimony pentathiocyanate as catalyst.

The results of the above examples are summarized in the following table.

TABLE 1

| Ex. | Polycondensation catalyst | Concentration[1] | Intrinsic viscosity $[\eta]$ | Softening temperature, °C. | Total condensation time [hrs.] |
|---|---|---|---|---|---|
| 1 | 1,2-di-(2-pyridyl)ethylene-antimony pentabromide | 0.1 | 0.96 | 260–261 | 2 |
| 2 | 1,2-di-(4-pyridyl)ethylene-antimony pentabromide | 0.1 | 0.77 | 258–260 | 2 |
| 3 | do | 0.05 | 0.77 | 258–260 | 2 |
| 4 | do | 0.01 | 0.77 | 258–260 | 2 |
| 5 | do | 0.01 | 0.84 | 258–260 | 3 |
| 6 | do | 0.01 | 0.76 | 258–260 | 2 |
| 7 | 1,2-(dimorpholino)-ethane-antimony pentaiodide | 0.05 | 0.73 | 258–260 | 2 |
| 8 | 1,2-di(2-pyridyl)ethylene-antimony pentaiodide | 0.05 | 0.78 | 258–260 | 2 |
| 9 | 1,2-di(2-pyridyl)ethylene-antimony pentathiocyanate. | 0.05 | 0.73 | 258–260 | 2 |

[1] Percent by weight with reference to DMT.

COMPARATIVE TESTS

Comparisons in respect to the total condensation time and the attainable viscosities depend very strongly on the reaction conditions chosen and on the apparatus used. Accordingly, the comparison polycondensations were carried out with known polycondensation catalysts, such as, for example, $Sb_2O_3$, under the conditions as in example 1.

| Ex. | Polycondensation catalyst | Concentration[1] | Intrinsic viscosity $(\eta)$ | Softening temperature, °C. | Total condensation time, hrs. |
|---|---|---|---|---|---|
| 10 | $Sb_2O_3$ | 0.01 | 0.50 | 240–244 | 3 |
| 11 | $Sb_2O_3$ | 0.05 | 0.55 | 244–246 | 3 |
| 12 | $Sb_2O_3$ | 0.1 | 0.63 | 250–252 | 3 |
| 13 | $Sb_2O_3$ | 0.01 | 0.68 | 250–252 | 5 |
| 14 | $Sb_2O_3$ | 0.05 | 0.70 | 250–252 | 5 |
| 15 | $Sb_2O_3$ | 0.1 | 0.77 | 254–256 | 5 |
| 16 | $Sb_2O_3$ | 0.01 | 0.72 | 254–256 | 6 |
| 17 | $Sb_2O_3$ | 0.05 | 0.77 | 254–256 | 6 |
| 18 | $Sb_2O_3$ | 0.1 | 0.70 | 254–256 | 6 |

[1] Percent by weight with reference to DMT.

Comparison of the two tables shows the improved results using the polycondensation catalysts of this invention.

EXAMPLE 19

Terephthalic acid and ethylene glycol are directly esterified pursuant to example 1 of U.S. Pat. No. 3,457,297 as follows. Eighty-three parts of terephthalic acid, 125 parts of ethylene glycol and 0.11 part of bismuth triphenyl were heated while stirring in an electrically heated reaction vessel provided with an agitator and distillation column. At the boiling point of the glycol, the reaction commenced and water was split off. Over a reaction period of 3½ hours, the sump temperature rose to about 204° C. During this time, the reaction composition became increasingly more fluid and, finally, crystal clear. During the reaction period at a temperature close to 100°C., about 17 parts of water passed over the head of the column. After cooling, the esterification product was of a waxy consistency and was pure white.

The esterification product could then be polycondensed using any one of the catalysts set forth in examples 1-9 above to produce a polyester suitable for cuttings or textile fibers.

Having described our invention, those skilled in the art will recognize that various modifications may be made thereto within the skill of the art and we intend our invention to be limited solely by the following claims:

We claim:

1. In a process for the production of linear polyalkylene terephthalates suitable for cuttings and textile fibers comprising the steps of (1) esterification of terephthalic acid or transesterification of a dialkyl terephthalate with an alkylene glycol, and (2) polycondensing the resultant di(alkylene glycol) terephthalate in the presence of metal compounds as catalysts, the improvement which comprises effecting the polycondensation in the presence of a catalytic amount of an antimony complex compound as said metal catalyst compound, said antimony complex compound having the formula $$[SbX_n] \cdot \frac{n-3}{m} Z,$$

wherein X is a halogen or thiocyanate; n is a whole number from 4 to 6; and Z is selected from the group consisting of di(pyridyl)ethylene and di(morpholino)ethane bases of valence M 2, and mixtures of said bases.

2. The process of claim 1 in which said alkylene glycol is ethylene glycol.

3. The process of claim 2 in which said dialkyl terephthalate is dimethyl terephthalate.

4. The process of claim 1 in which n is 5.

5. The process of claim 4 in which X is a halogen.

6. The process of claim 5 in which the halogen is selected from bromine and iodine.

7. The process of claim 6 in which the antimony complex catalyst is 1,2-di(2-pyridyl)ethylene-antimony pentabromide.

8. The process of claim 6 in which the antimony complex catalyst is 1,2-di(4-pyridyl)ethylene-antimony pentabromide.

9. The process of claim 76 in which the antimony complex catalyst is 1,2-(dimorpholino)-ethane-antimony pentaiodide.

10. The process of claim 6 in which the antimony complex catalyst is 1,2-di(2-pyridyl)ethylene-antimony pentaiodide.

11. The process of claim 4 in which the antimony complex catalyst is 1,2-di(2-pyridyl)ethylene-antimony pentathiocyanate.

* * * * *